United States Patent
Sato

(10) Patent No.: US 9,369,629 B2
(45) Date of Patent: Jun. 14, 2016

(54) COMMUNICATION APPARATUS, CONTROL METHOD OF COMMUNICATION APPARATUS AND PROGRAM

(71) Applicant: CANON KABUSHIKI KAISHA, Tokyo (JP)

(72) Inventor: Ryosuke Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 14/108,084

(22) Filed: Dec. 16, 2013

(65) Prior Publication Data

US 2014/0176736 A1 Jun. 26, 2014

(30) Foreign Application Priority Data

Dec. 26, 2012 (JP) .................................. 2012-283087

(51) Int. Cl.
*H04N 5/232* (2006.01)
*H04N 1/00* (2006.01)

(52) U.S. Cl.
CPC ....... *H04N 5/23241* (2013.01); *H04N 1/00307* (2013.01); *H04N 1/00344* (2013.01); *H04N 1/00891* (2013.01); *H04N 5/23206* (2013.01); *H04N 2201/0072* (2013.01); *H04N 2201/0074* (2013.01)

(58) Field of Classification Search
CPC ............ H04N 5/23267; H04N 5/2327; H04N 5/23274; H04N 5/23277; H04N 5/23206; H04N 21/4223

USPC ................................ 348/211.99–211.14, 372
See application file for complete search history.

(56) References Cited

U.S. PATENT DOCUMENTS

| | | | |
|---|---|---|---|
| 8,085,310 B2 | 12/2011 | Matsumoto | |
| 2011/0032367 A1* | 2/2011 | Ugawa | H04N 1/00283 348/211.1 |
| 2011/0156879 A1* | 6/2011 | Matsushita | H04L 63/08 340/10.1 |

* cited by examiner

*Primary Examiner* — Tuan Ho
(74) *Attorney, Agent, or Firm* — Canon U.S.A., Inc. IP Division

(57) ABSTRACT

A communication apparatus of the present invention includes a first acquisition unit configured to acquire first information that causes the communication apparatus to decide whether a different communication apparatus has a function to disconnect a power source according to an instruction from the communication apparatus, a second acquisition unit configured to acquire second information that shows an operation mode of the different communication apparatus, and a notification unit configured to notify a user that, in a case where the wireless communication with the different communication apparatus is disconnected, the different communication apparatus is instructed to disconnect the wireless communication and disconnect the power source of the different communication apparatus according to the first information and the second information.

10 Claims, 15 Drawing Sheets

COMMUNICATION APPARATUS, CONTROL METHOD OF COMMUNICATION APPARATUS AND PROGRAM

BACKGROUND OF THE INVENTION

1. Field of the Invention

The present invention relates to communication apparatuses that can perform power source control between the apparatuses.

2. Description of the Related Art

In the related art, there is a technique of disconnecting a power source of a different communication apparatus according to an instruction from a communication apparatus. Moreover, there is a technique that a different communication apparatus disconnects a power source according to its own operation mode in a case where a communication apparatus instructs the different communication apparatus to disconnect the power source (U.S. Pat. No. 8,085,310).

SUMMARY OF THE INVENTION

However, there is a possibility that the user of a communication apparatus does not know whether a different communication apparatus has a function to disconnect a power source of the different communication apparatus according to an instruction from the communication apparatus. Moreover, in a case where the different communication apparatus disconnects the power source according to its own operation mode, there is a possibility that the user of the communication apparatus does not know whether the power source of the different communication apparatus is actually disconnected.

To solve the above problems, it is an object of the present invention to be able to instruct power disconnection by a communication apparatus in a case where it is possible to disconnect a power source of a different communication apparatus.

A communication apparatus of the present invention includes: a first acquisition unit configured to acquire first information that causes the communication apparatus to decide whether a different communication apparatus has a function to disconnect a power source according to an instruction from the communication apparatus; a second acquisition unit configured to acquire second information that shows an operation mode of the different communication apparatus; and a notification unit configured to notify a user that, in a case where the wireless communication with the different communication apparatus is disconnected, the different communication apparatus is instructed to disconnect the wireless communication and disconnect the power source of the different communication apparatus according to the first information and the second information.

Moreover, a communication apparatus according to another aspect of the present invention includes: a first notification unit configured to notify a different communication apparatus of first information that causes the different communication apparatus to decide whether the communication apparatus has a function to disconnect a power source according to an instruction from the different communication apparatus; a second notification unit configured to notify the different communication apparatus of second information that shows an operation mode of the communication apparatus; a reception unit configured to receive a disconnection instruction of communication between the communication apparatus and the different communication apparatus, and a power disconnection instruction of the communication apparatus, from the different communication apparatus; and a control unit configured to disconnect the communication with the different communication apparatus and disconnect the power source of the communication apparatus in a case where the reception unit receives the disconnection instruction and the power disconnection instruction.

According to the present invention, it is possible to instruct power disconnection by a communication apparatus in a case where the communication apparatus can disconnect a power source of a different communication apparatus. Moreover, it is possible to notify information required for power disconnection to the different communication apparatus in a case where the communication apparatus can disconnect the power source according to an instruction from the different communication apparatus.

Further features of the present invention will become apparent from the following description of exemplary embodiments (with reference to the attached drawings).

DESCRIPTION OF THE EMBODIMENTS

Figure 1:
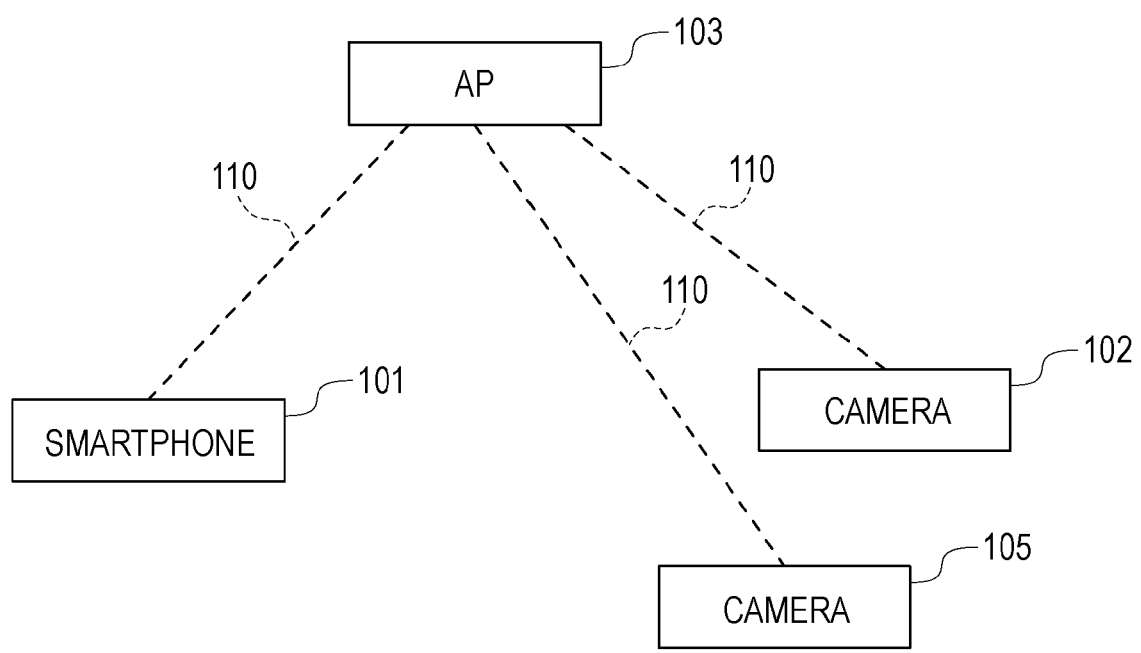
FIG. 1 is a view illustrating a network configuration.

FIG. 1 illustrates a network configuration of a communication system according to the present embodiment.

A reference numeral of "101" represents a smartphone (mobile phone) as an example of a communication apparatus. Here, it is not limited to the smartphone and may be other apparatuses such as a PDA, a PC and a remote controller. A reference numeral of "102" represents a digital camera (hereafter referred to as "camera") as an example of other communication apparatuses that are communication partners of the smartphone 101. The camera 102 has a function to turn off (disconnect) the power source of the camera 102 by itself according to an instruction from the smartphone 101. Here, it is not limited to the camera and other apparatuses such as a printer and storage are available. A reference numeral of "103" represents an access point (hereafter referred to as "AP") that establishes a wireless network (wireless NW). The smartphone 101 and the camera 102 participate in the wireless network established by the AP 103 and perform communication through the AP 103 (110). A reference numeral of 105 represents a digital camera (hereafter referred to as "camera") as an example of other different communication apparatuses that are communication partners of the smartphone 101. The camera 105 does not have a function to turn off (disconnect) the power source of the camera 102 by itself according to an instruction from the smartphone 101. Here, it is not limited to the camera and other apparatuses such as a printer and storage are available.

In the present embodiment, an explanation is given with an assumption that the smartphone 101, the cameras 102 and 105 and the AP 103 perform communication in accordance with the infrastructure mode of the IEEE802.11 series. However, it is not limited to the infrastructure mode, and the smartphone 101 and the camera 102/105 may perform direct communication in accordance with the ad hoc mode of the IEEE802.11 series. Moreover, one of the smartphone 101 and the camera 102/105 may operate as an access point such that the smartphone 101 and the camera 102/105 perform direct communication. Moreover, the smartphone 101 and the camera 102/105 may perform direct communication by use of Wi-Fi Direct. Moreover, the communication scheme is not limited to the IEEE802.11 series, and a communication scheme in accordance with Bluetooth, IrDA, ZigBee or NFC (Near Field Communication) is possible.

Figure 2:
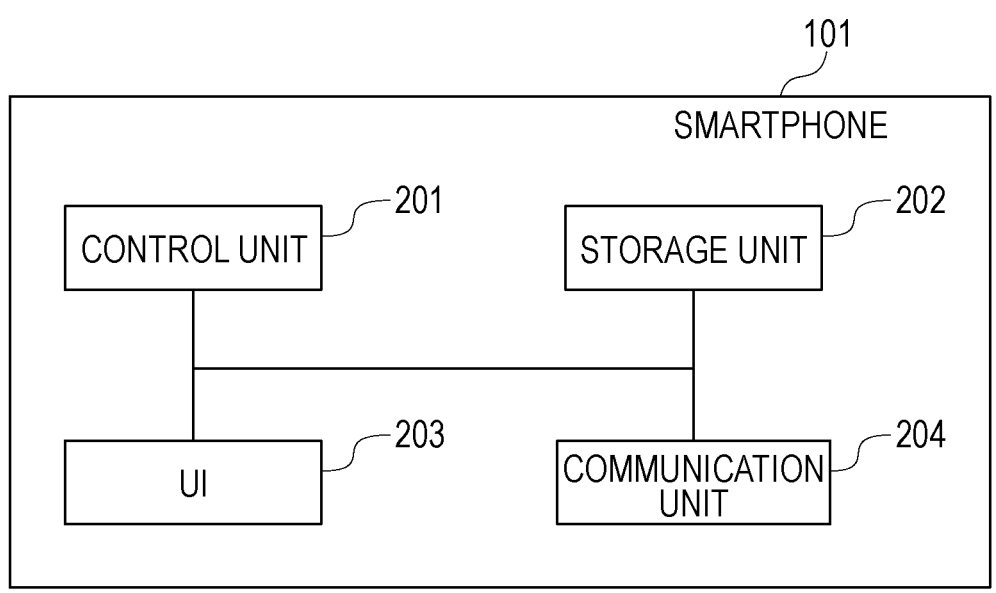
FIG. 2 is a hardware configuration diagram of a smartphone 101.

FIG. 2 illustrates a hardware configuration of the smartphone 101.

A control unit 201 is configured with a CPU or MPU, and controls the whole of the camera 101 by executing a program stored in a storage unit 202. Here, the whole of the smartphone 101 may be controlled in cooperation with an OS (Operating System) being executed by the control unit 201. The storage unit 202 is configured with ROM or RAM, and stores various kinds of information such as programs to execute various operations described later and communication parameters. Here, as the storage unit 202, it may be possible to use storage media such as a flexible disk, a hard disk, an optical disk, a magneto-optical disk, a CD-ROM, a CD-R, a magnetic tape, a nonvolatile memory card and a DVD, in addition to memories such as ROM and RAM. Also, data as illustrated in FIG. 3B is stored in the storage unit 202.

A reference numeral of "203" represents a user interface unit (hereafter "UI"), which displays various kinds of information and receives various kinds of operations from the user. The UI 203 has a memory which is not illustrated, and can keep continuously displaying specified information from a display control unit 305 described later for a predetermined time period by using the memory. A reference numeral of "204" represents a communication unit, which performs wireless communication in accordance with the infrastructure mode of the IEEE802.11 series.

Figure 3A:
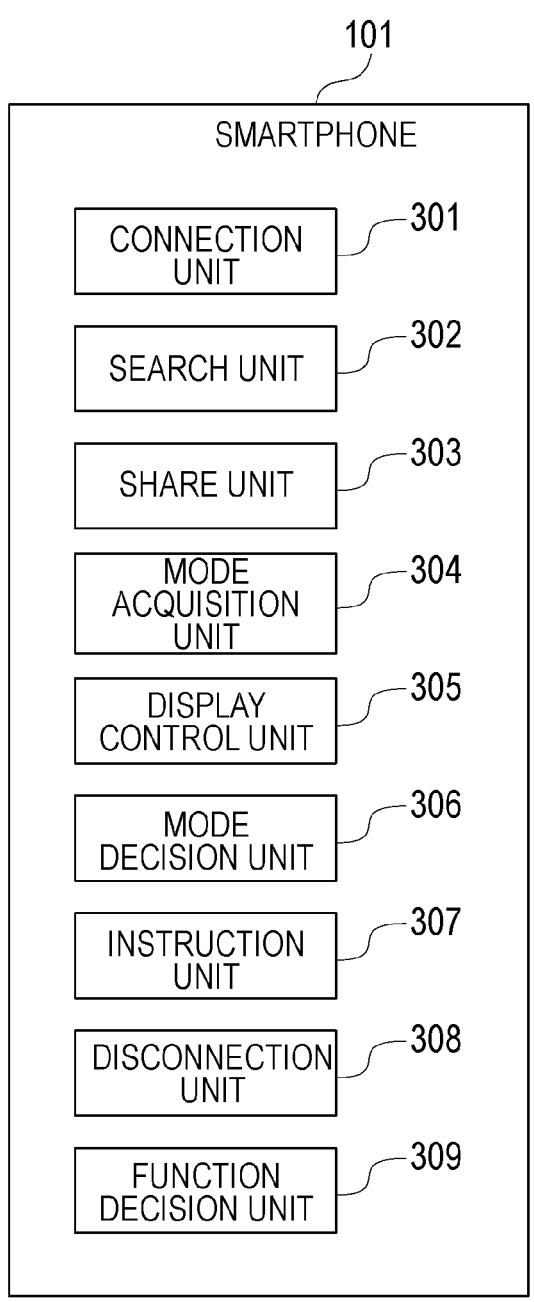
FIG. 3A is a software function block diagram of the smartphone 101.
Figure 3B:
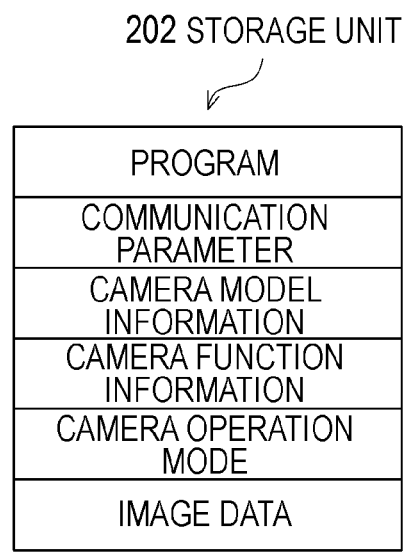
FIG. 3B is a diagram representing example programs stored in the storage unit 202.

FIGS. 3A-B illustrate software function blocks realized by reading out a program stored in the storage unit 202 by the control unit 201 of the smartphone 101. Here, at least part of the software function blocks illustrated in FIG. 3 may be realized by hardware.

A reference numeral of "301" represents a connection unit connected to the AP 103 through the communication unit 204 on the basis of a communication parameter stored in advance in the storage unit 202. A reference numeral of "302" represents a search unit that controls the communication unit 204 and searches for a camera. A reference numeral of "303" represents a share unit that shares model information and function information with the camera through the communication unit 204. Here, the model information denotes the device name or manufacture name of each of the smartphone 101 and the camera, application version information or information on the name which the user gives to the device, and so on. Moreover, the function information denotes a list of the function name to which each of the smartphone 101 and the camera corresponds. Here, the function information may include command information to be operated by a partner apparatus (the camera for the smartphone 101 and the smartphone 101 for the camera).

A reference numeral of "304" represents an acquisition unit that acquires an operation mode of the camera. A reference numeral of "305" represents a display control unit that controls the UI 203 and performs various kinds of display control. A reference numeral of "306" represents a mode decision unit that determines the operation mode of the camera. A reference numeral of "307" represents an instruction unit that instructs communication disconnection or camera power-off of the camera to the camera. A reference numeral of "308" represents a disconnection unit that disconnects communication with the camera. A reference numeral of "309" represents a decision unit that decides whether the camera has a predetermined function.

Figure 4:
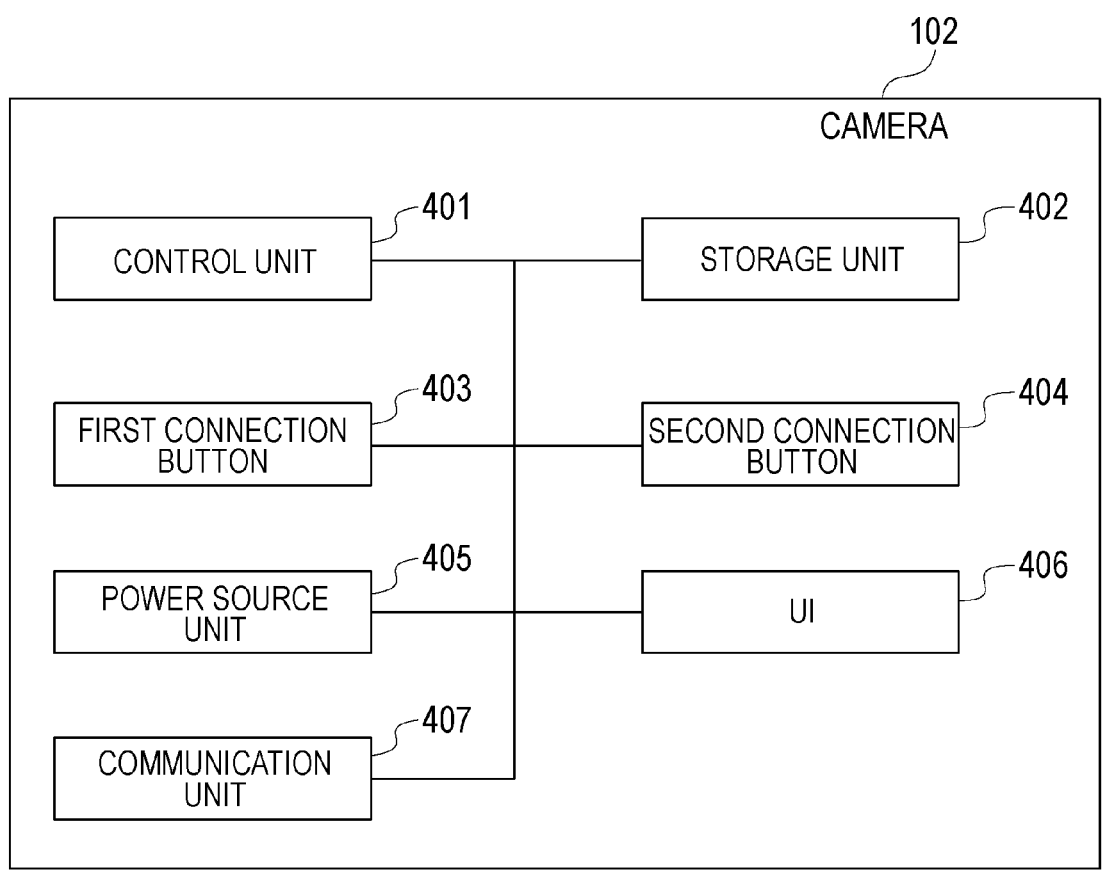
FIG. 4 is a hardware configuration diagram of a camera 102.

FIG. 4 illustrates a hardware configuration of the camera 102.

The control unit 201 is configured with a CPU or MPU, and controls the whole of the camera 101 by executing a program stored in the storage unit 202. Here, the whole of the smartphone 101 may be controlled in cooperation with an OS (Operating System) being executed by the control unit 201. The storage unit 202 is configured with ROM or RAM, and stores various kinds of information such as programs to execute various operations described later and communication parameters. Here, as the storage unit 202, it may be possible to use storage media such as a flexible disk, a hard disk, an optical disk, a magneto-optical disk, a CD-ROM, a CD-R, a magnetic tape, a nonvolatile memory card and a DVD, in addition to memories such as ROM and RAM.

Reference numerals of "403" and "404" represent connection buttons that are mutually and independently installed. A reference numeral of "403" represents a first connection button and a reference numeral of "404" represents a second connection button. Here, either one or both of them may be formed as a button on a touch panel or a button that can be selected on a display screen. A reference numeral of "405" represents a power source unit of the camera 102. A reference numeral of "406" represents a user interface unit (hereafter "UI"), which displays various kinds of information and receives various kinds of operations from the user. A reference numeral of "407" represents a communication unit, which performs wireless communication in accordance with the infrastructure mode of the IEEE802.11 series.

Figure 5:
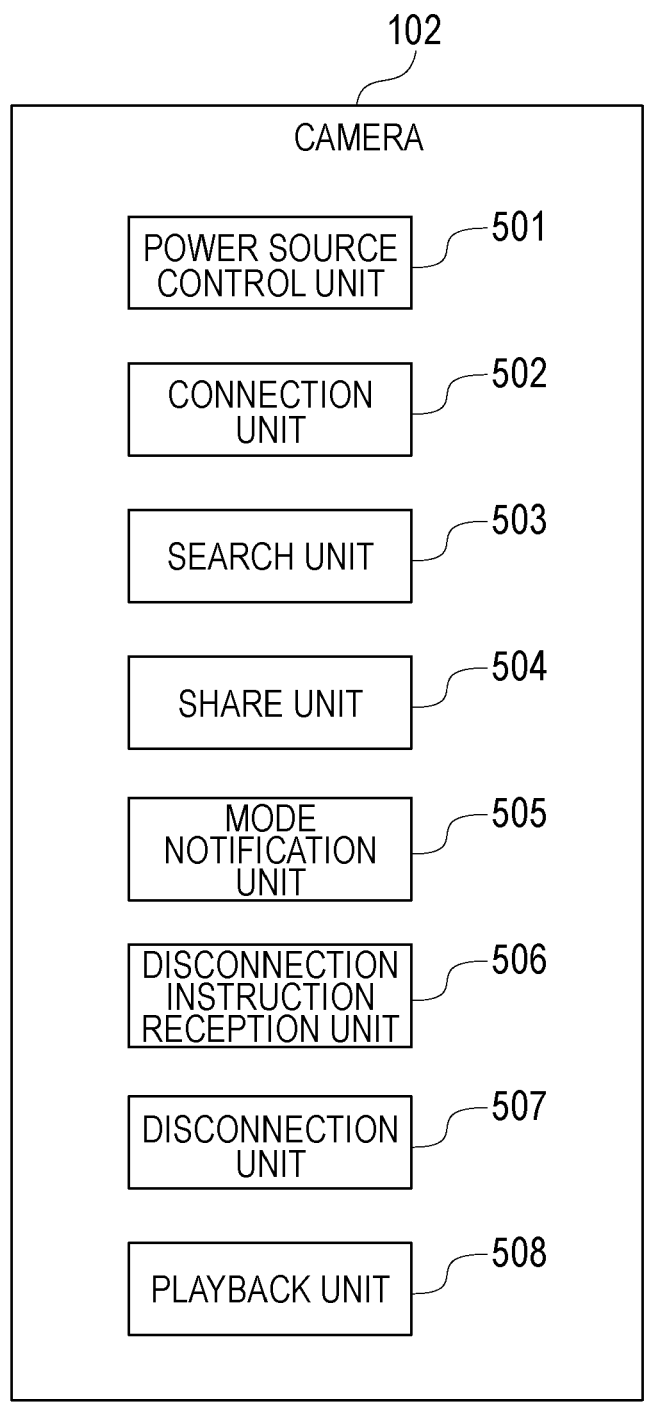
FIG. 5 is a software function block diagram of the camera 102.

FIG. 5 illustrates software function blocks realized by reading out a program stored in a storage unit 402 by a control unit 401 of the camera 102. Here, at least part of the software function blocks illustrated in FIG. 5 may be realized by hardware.

A reference numeral of "501" represents a power source control unit that controls the power source unit 405 to control the power source state of the camera 102. A reference numeral of "502" represents a connection unit that performs connection processing with the smartphone 101 through a communication unit 406. A reference numeral of "503" represents a search unit that searches for the smartphone 101 through the communication unit 406. A reference numeral of "504" represents a share unit that shares model information and function information with the smartphone 101. A reference numeral of "505" represents a mode notification unit that notifies an operation mode of the camera 102 to the smartphone 101 through the communication unit 406. A reference numeral of "506" represents a disconnection instruction reception unit that receives a communication disconnection instruction from the smartphone 101 through the communication unit 406. A reference numeral of "507" represents a disconnection unit that performs disconnection processing with the smartphone 101 through the communication unit 406. A reference numeral of "508" represents a playback unit that plays an image stored in the storage unit 402 on a UI 406.

Next, a case is described where the camera 102 operates in a first operation mode. Here, the first operation mode denotes an operation mode that is transited by pressing the first connection button 403 in the camera 102 by the user. While the camera 102 and the smartphone 101 are connected to each other in the first operation mode, the UI 406 of the camera 102 does not receive a user operation (for example, image transfer instruction). Also, the power source operation of the camera 102 is not limited to this. Here, in a case where the power source of the camera 102 is in an OFF state, an explanation is given with an assumption that the user presses the first connection button 403.

Figure 6:
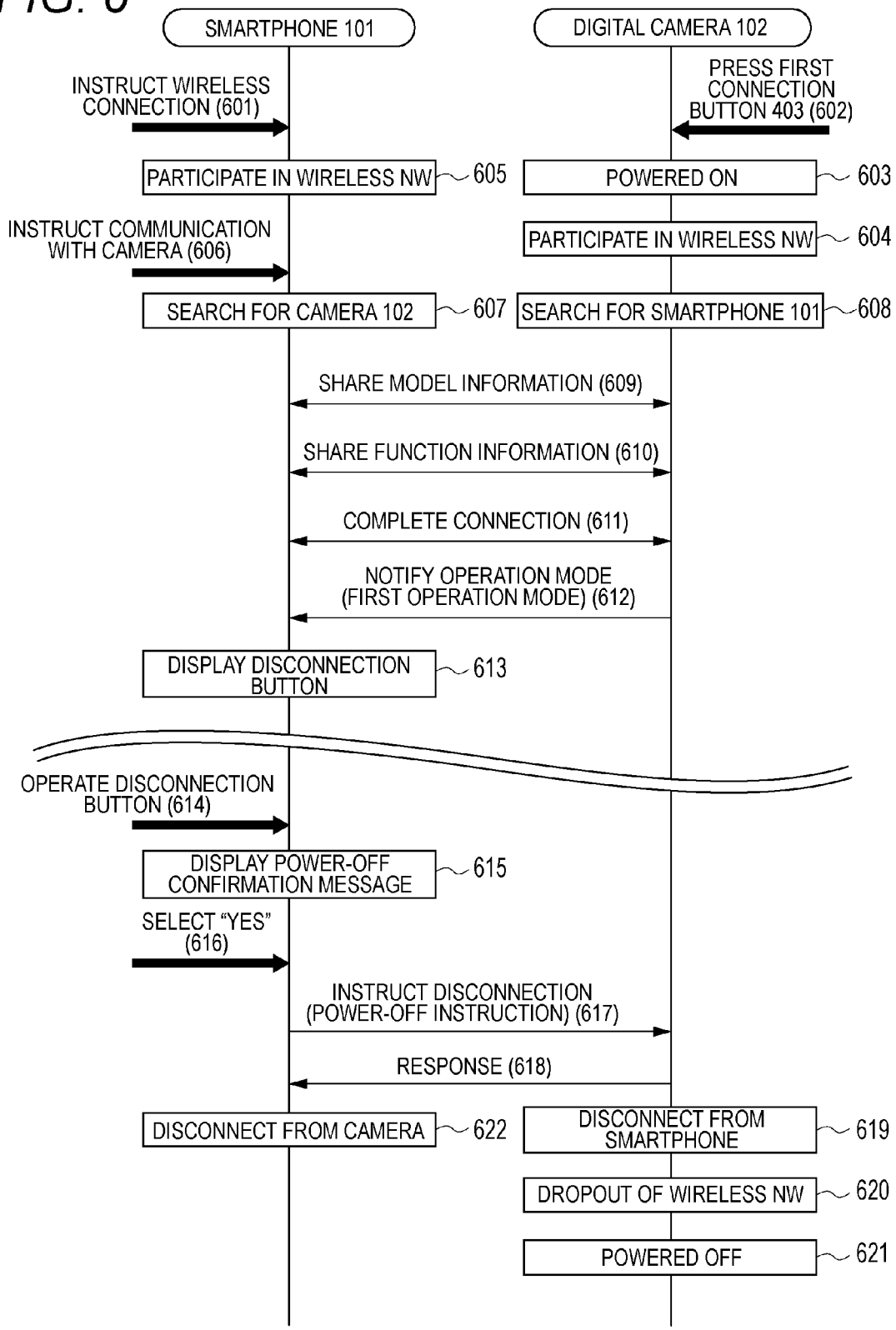
FIG. 6 is a sequence chart of the smartphone 101 and the camera 102.
Figure 7:
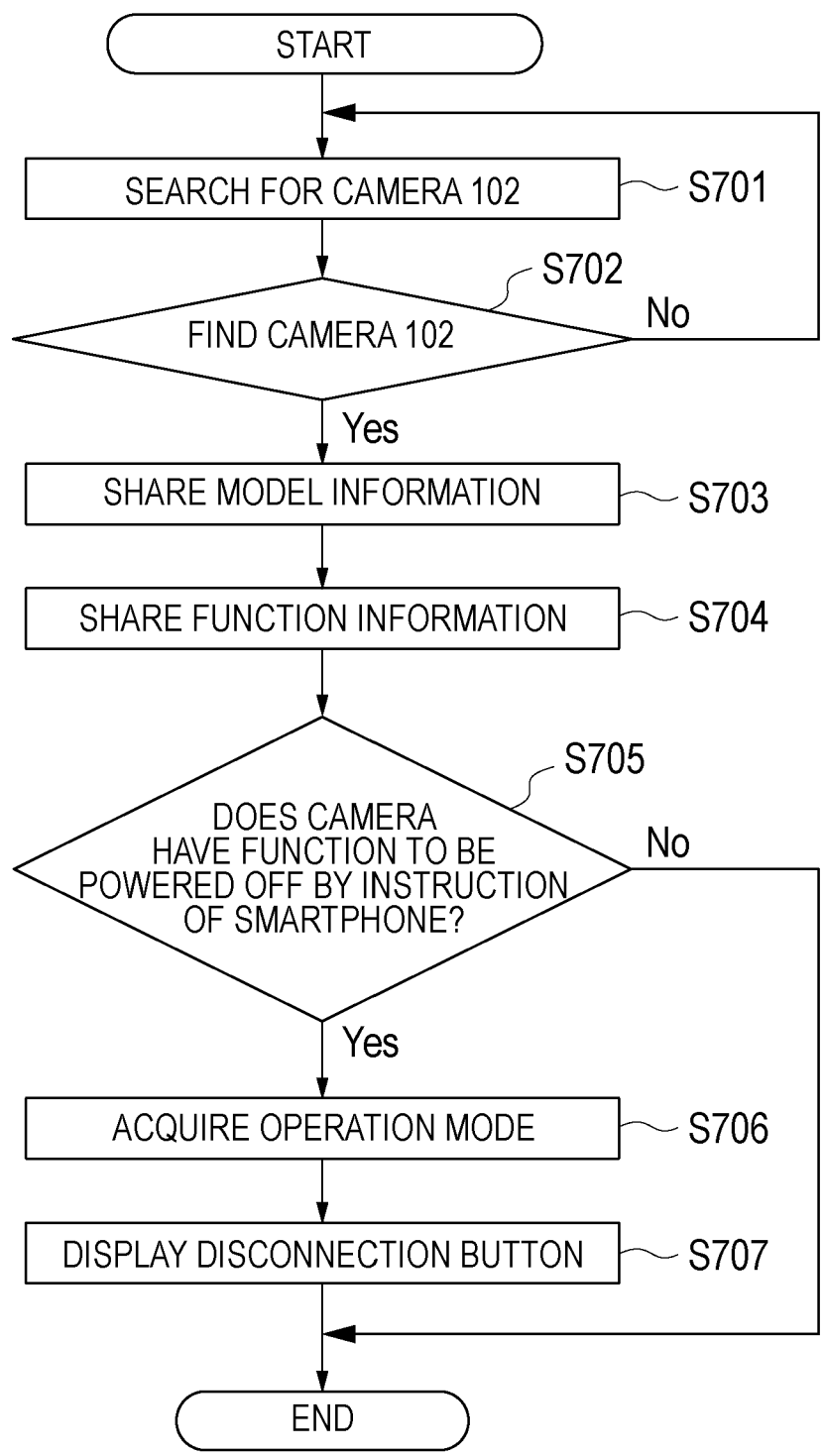
FIG. 7 is a flowchart realized by the smartphone 101.
Figure 8:
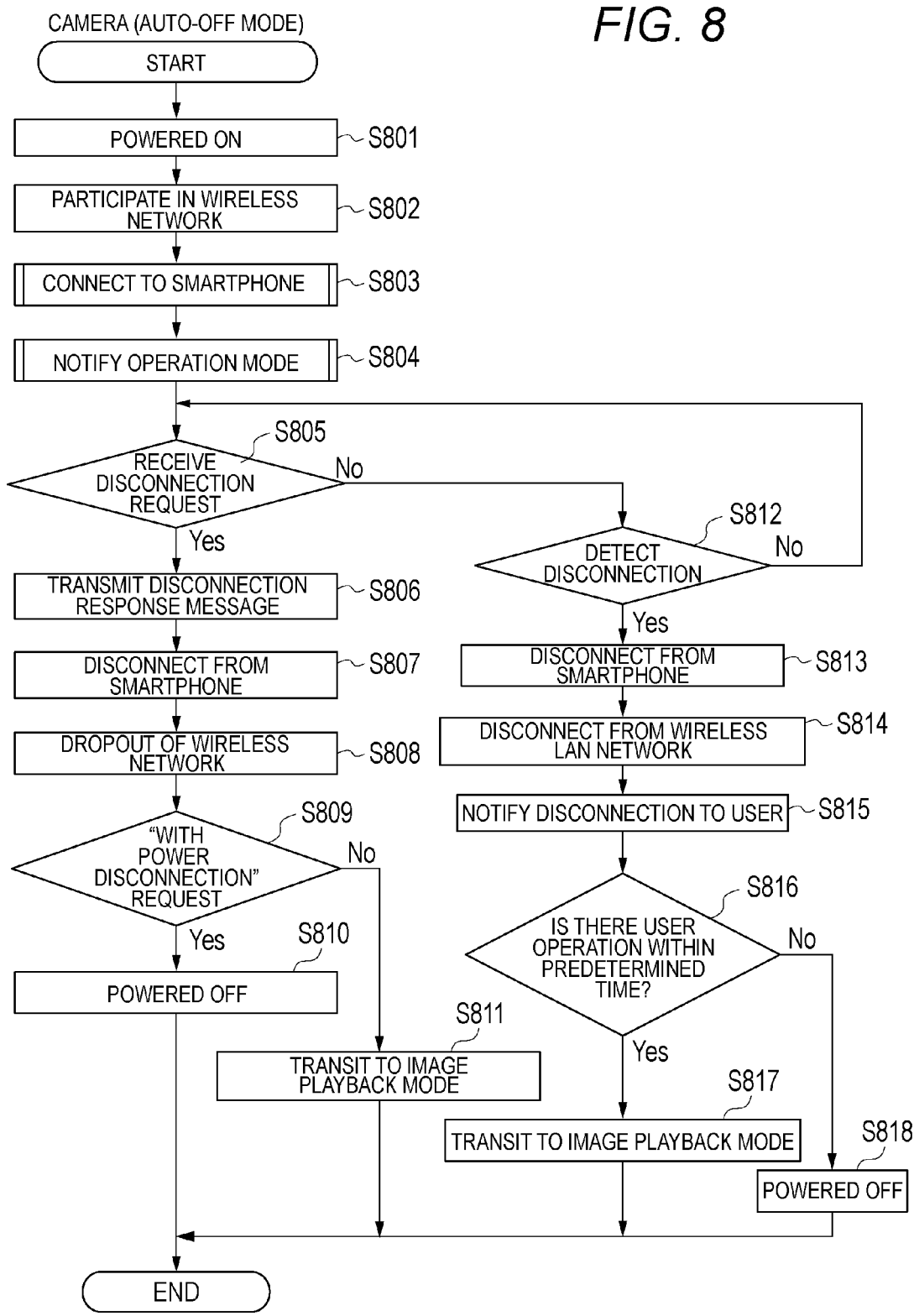
FIG. 8 is a flowchart realized by the camera 102.

FIG. 6 illustrates a sequence chart in a case where the camera 102 operates in the first operation mode. FIG. 7 illustrates a flowchart realized by reading out a program stored in the storage unit 202 by the control unit 201 in a case where the user instructs wireless connection in the smartphone 101 (601). Moreover, FIG. 8 illustrates a flowchart realized by reading out a program stored in the storage unit 402 by the control unit 401 in a case where the user presses the first connection button 403 in the camera 102 (602).

When the first connection button 403 is pressed in the camera 102, the power source control unit 501 turns on (powers on) the power source of the camera 102 (603 and S801). Subsequently, the connection unit 502 connects to the AP 103 on the basis of communication parameters stored in advance in the storage unit 402 and causes the camera 102 to participate in the wireless network (wireless LAN) established by the AP 103 (604 and S802). Here, the communication parameters include identification information (SSID) of the wireless network established by the AP 103 and information such as an encryption key, encryption scheme, authentication key and authentication scheme used for communication with the AP 103. Here, in a case where the storage unit 402 does not store the communication parameters used for connection with the AP 103, it may be possible to start a sequence to automatically set communication parameters such as WPS (Wi-Fi Protected Setup) and acquire information on the communication parameters from the AP 103. Moreover, it may be possible to prompt the user to input communication parameters through the UI 406. Thus, it is possible to store the communication parameters used for connection with the AP 103 in the storage unit 402.

Meanwhile, when the user instructs wireless connection in the smartphone 101 through the UI 203, the connection unit 301 connects to the AP 103 on the basis of the communication parameters stored in advance in the storage unit 202. Thus, the smartphone 101 participates in the wireless network established by the AP 103 (605). Here, in a case where the storage unit 202 does not store the communication parameters used for connection with the AP 103, it may be possible to start a sequence to automatically set communication parameters such as WPS (Wi-Fi Protected Setup) and acquire information on the communication parameters from the AP 103. Moreover, it may be possible to prompt the user to input communication parameters through the UI 203. Thus, it is possible to store the communication parameters used for connection with the AP 103 in the storage unit 402.

Afterwards, when the user instructs connection with the camera 102 through the UI 203 (606), the search unit 302 starts searching for the camera 102 (607 and S701). To be more specific, the search unit 302 searches for the camera 102 by transmitting a search signal in accordance with the SSDP (Simple Service Discovery Protocol) defined in the UPnP (Universal Plug and Play). Here, it may be possible to search for the camera 102 by transmitting a search signal in accordance with the mDNS defined in Bonjour in addition to the SSDP or instead of the SSDP.

Also, in a case where the camera 102 is not detected within a predetermined time, it is assumed that the search processing ends as an error and the error end is notified of the user. Moreover, in the search processing, it is assumed that the power source is turned on to search for a camera to which wireless connection is instructed.

Figure 9:
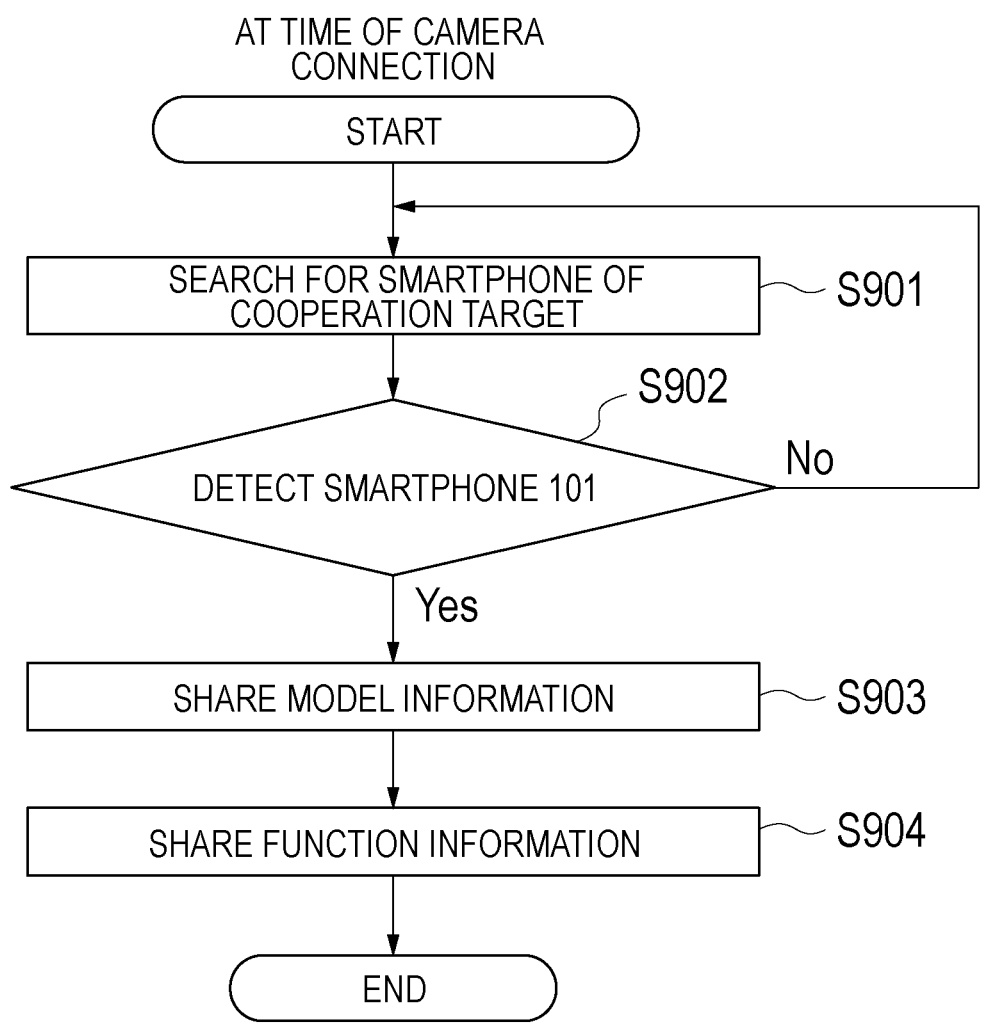
FIG. 9 is a flowchart realized by the camera 102.

Meanwhile, when connecting to the AP 103, the camera 102 performs processing (S803) to connect to the smartphone 101. FIG. 9 illustrates the details of the processing (S803) to connect to the smartphone 101.

First, the search unit 503 searches for the smartphone 101 (608 and S901). To be more specific, the search unit 503 searches for the smartphone 101 by transmitting both the search signal in accordance with the SSDP and the search signal in accordance with the mDNS. Here, both search signals need not be necessarily transmitted, and a search signal to be transmitted may be decided as follows. That is, it is decided whether the smartphone 101 corresponds to the SSDP or the smartphone 101 corresponds to the mDNS, on the basis of model information of the smartphone 101. Subsequently, the search signal in accordance with a protocol decided to correspond to it is transmitted and the search signal in accordance with a protocol decided not to correspond to it is not transmitted. In this case, it is assumed that device information of the smartphone 101 is stored in advance in the storage unit 402. By this means, since the search signal in accordance with the protocol to which the smartphone 101 does not correspond is not transmitted, it is possible to suppress the waste of wireless resources and reduce the processing load of the camera 102.

Subsequently, when the smartphone 101 and the camera 102 detect each other ("Yes" in S702 and "Yes" in S902), the smartphone 101 and the camera 102 share each other's model information (609, S703 and S903). In the smartphone 101, the share unit 303 requests device information to the camera 102 and acquires model information of the camera 102 as a response with respect to the request from the camera 102. Moreover, in the camera 102, the share unit 504 requests device information to the smartphone 101 and acquires model information of the smartphone 101 as a response with respect to the request from the smartphone 101.

When the model information is shared, the smartphone 101 and the camera 102 further share each other's function information (610, S704 and S904). In the smartphone 101, the share unit 303 requests function information to the camera 102 and acquires the function information of the camera 102 as a response with respect to the request from the camera 102. Moreover, in the camera 102, the share unit 504 requests function information to the smartphone 101 and acquires the function information of the smartphone 101 as a response with respect to the request from the smartphone 101.

Thus, the connection between the smartphone 101 and the camera 102 is established (611). Here, when the connection is completed, the flowchart illustrated in FIG. 9 is terminated in the camera 102 and it advances to S804 in FIG. 8.

When the connection is completed, the function decision unit 309 of the smartphone 101 decides whether the camera 102 has a function to disconnect the power source of the camera 102 by itself according to an instruction from the smartphone 101 (S705). Here, based on the device information, if it has a predetermined device name and is equal to or greater than a predetermined version, it is decided that the camera 102 has a function to disconnect the power source of the camera 102 by itself according to the instruction from the smartphone 101. However, it is not limited to this and it may be decided based on whether the function information includes a function to disconnect the power source of the camera 102 by itself by the camera 102 according to the instruction from the smartphone 101.

In a case where it is decided that the camera 102 has the function to disconnect the power source of the camera 102 by itself according to the instruction from the smartphone 101 ("Yes" in S705), the mode acquisition unit 304 acquires an operation mode from the camera 102 (612 and S706). Here, the mode notification unit 505 of the camera 102 notifies the smartphone 101 that the camera 102 operates in the first operation mode (S804), and the mode acquisition unit 304 acquires information showing that the camera 102 operates in the first operation mode (S706). Subsequently, the display control unit 305 displays (presents) a disconnection button (an icon in this case) to disconnect communication with the camera 102 on the UI 203 (613 and S707). By operating this disconnection button, the user can disconnect the connection between the smartphone 101 and the camera 102, which was established in 611 of FIG. 6.

On the other hand, in a case where it is decided that the function to disconnect the power source of the camera 102 by itself according to the instruction from the smartphone 101 is not provided ("No" in S705), the mode acquisition unit 304 does not acquire the operation mode of the camera and the display control unit 305 does not display the disconnection button.

Figure 10:
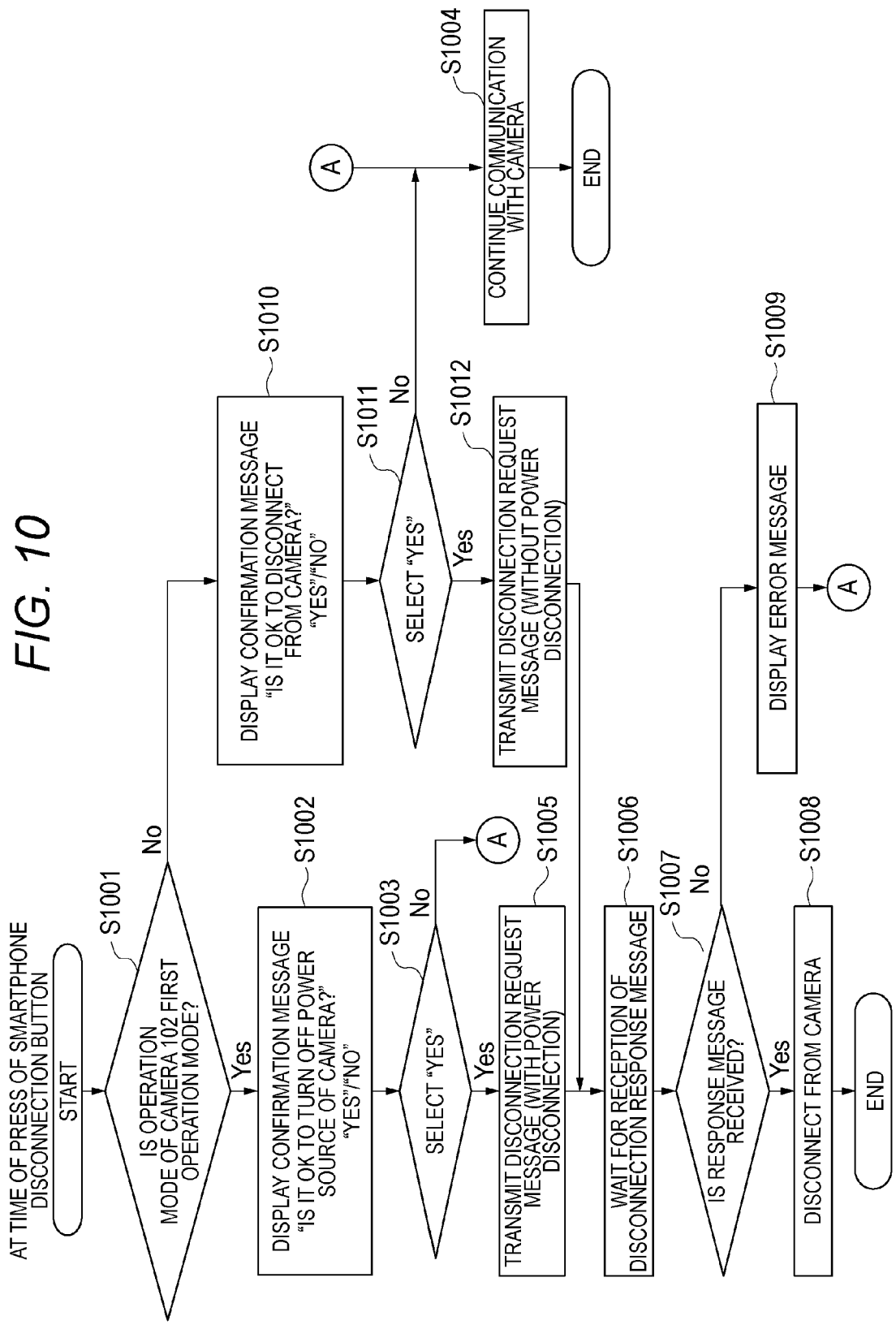
FIG. 10 is a flowchart realized by the smartphone 101.

Next, using FIGS. 6, 8 and 10, a case is described where the disconnection button displayed on the UI 203 is operated. FIG. 10 is a flowchart realized by reading out the program stored in the storage unit 202 by the control unit 201 in a case where the disconnection button displayed on the UI 203 is operated.

When the disconnection button is operated by the user (614), the mode decision unit 306 decides whether the operation mode of the camera 102 is the first operation mode (S1001). In the case of the first operation mode ("Yes" in S1001), the display control unit 305 inquires the user whether to turn off the power source of the camera 102, through the UI 203 (615 and S1002). To be more specific, a confirmation message like "Is it OK to turn off the power source of the camera? 'YES' 'NO'"" is displayed on the UI 203. Here, in a case where "No" is selected, that is, in a case where the power-off of the camera 102 is not permitted by the user ("No" in S1003), it returns to the state before the disconnection button is pressed, and the communication with the camera 102 is continued (S1004).

By contrast, in a case where "Yes" is selected, that is, in a case where the power-off of the camera 102 is permitted by the user (616 and "Yes" in S1002), an instruction unit 307 instructs the camera 102 to disconnect the connection established in 611 of FIG. 6 and turn off the power source. To be more specific, the instruction unit 307 transmits a predetermined disconnection request message including information that instructs the power-off (power disconnection) of the camera 102 to the camera 102 (617 and S1005). Subsequently, the instruction unit 307 waits for a response from the camera 102 with respect to the disconnection request message (S1006).

The disconnection request message transmitted from the smartphone 101 is received by the disconnection instruction reception unit 506 of the camera 102 ("Yes" in S805 of FIG. 8). When the disconnection request message is received, the disconnection instruction reception unit 506 transmits a disconnection response message that is a response signal with respect to the disconnection request message (618 and S806). Next, the disconnection unit 507 disconnects the connection with the smartphone 101 (619 and S807). Subsequently, the disconnection unit 507 causes the camera 102 to drop out of the wireless network established by the AP 103 (620 and S808). Next, the disconnection instruction reception unit 506 decides whether the received disconnection request message includes information to instruct the power-off of the camera 102 (S809). As a result of the decision, in a case where it is decided that the information to instruct the power-off is included ("Yes" in S809), the power source control unit 501 turns off the power source of the camera 102 (621 and S810) and the processing illustrated in FIG. 8 is terminated. On the other hand, in a case where it is decided that the information to instruct the power-off is not included ("No" in S809), the playback unit 508 transits to an image playback mode to display an image stored in the storage unit 402 on the UI 406 of the camera 102 (S811). In such a case, the power source control unit 501 does not turn off the power source of the camera 102.

Meanwhile, the disconnection response message transmitted from the camera 102 is received by the instruction unit 307 of the smartphone 101 ("Yes" in S1007 of FIG. 10). Subsequently, the disconnection unit 308 performs disconnection processing of the connection with the camera 102 (622 and S1008).

Also, in a case where the disconnection response message is not received even when a predetermined time has passed since the disconnection request message was transmitted ("No" in S1007), the display control unit 305 displays an error message on the UI 203 (S1009). Here, regarding the case where the disconnection response message is not received, for example, it is caused in a case where the disconnection response message from the camera 102 cannot be received due to wireless communication errors. Moreover, it is also caused in a case where the camera 102 cannot receive the disconnection request message due to wireless communication errors. After the error message is displayed, it returns to the state before the disconnection button is pressed, and the communication with the camera 102 is continued (S1004).

Thus, in a case where the camera 102 and the smartphone 101 are wirelessly connected to each other by pressing the first connection button 403 by the user in the camera 102, it is possible to disconnect the power source of the camera 102 according to disconnection between the camera 102 and the smartphone 101.

In the above, an explanation has been given with an assumption that the user presses the first connection button 403 when the power source of the camera 102 is in an OFF state. In a case where the user presses the first connection button 403 when the power source of the camera 102 is not in the OFF state (powered-on), the flowchart progresses from S802 of FIG. 8 in the camera 102.

Therefore, in a case where the camera 102 and the smartphone 101 are wirelessly connected to each other by pressing the first connection button 403 by the user even when the power source of the camera 102 is turned on, the power source of the camera 102 is disconnected according to disconnection of the wireless connection. By this means, for example, even if the user puts away the camera 102 in the bag after pressing the first connection button 403, since the power source is automatically turned off according to disconnection from the smartphone 101, it is possible to prevent the battery of the camera 102 from being wasted.

Here, a case is described where communication is forcefully terminated in the smartphone 101 when the communication is established between the smartphone 101 and the camera 102. Also, the forced termination of communication is caused in a case where a termination instruction of an application used for communication with the camera 102 in the smartphone 101, a stop instruction of a wireless unit of the smartphone 101 or a power-off operation of the smartphone 101 is given.

When the communication is forcefully terminated in the smartphone 101, the instruction unit 307 instructs the camera 102 to disconnect the connection established in 611 of FIG. 6. To be more specific, the instruction unit 307 transmits a disconnection message (here, a byebye message defined by UPnP or mDNS) to the camera 102. Subsequently, the disconnection unit 308 performs disconnection processing of the connection with the camera 102.

Meanwhile, when receiving the disconnection message from the smartphone 101 (S812), the disconnection unit 507 of the camera 102 disconnects the connection with the smartphone 101 (S813). Subsequently, the disconnection unit 507 causes the camera 102 to drop out of the wireless network established by the AP 103 (S814). Next, the disconnection unit 507 notifies disconnection of communication with the smartphone 101 to the user through the UI 406 (S815).

Afterwards, the power source control unit 501 decides whether there is a user operation with respect to the camera 102 within a predetermined time (S816). In a case where there is the user operation within the predetermined time ("Yes" in S816), the camera 102 is not powered off and the playback unit 508 transits to an image playback mode to display an image stored in the storage unit 402 on the UI 406 of the camera 102 (S817). By contrast, in a case where there is no user operation within the predetermined time ("No" in S816), the power source control unit 501 turns off the power source of the camera 102 (S818) and the processing illustrated in FIG. 8 is terminated.

Next, a case is described where the camera 102 operates in a second operation mode. Here, the second operation mode denotes an operation mode that is set by pressing a second connection button 404 (different from the first connection button 403) in the camera 102 by the user. Unlike the first connection button 403, it is assumed that the second connection button 404 cannot be pressed in a case where the power source of the camera 102 is in an OFF state. Here, the phrase "cannot be pressed" means that, even if the second connection button 403 is pressed, the camera 102 does not decide that it is pressed. However, it is not limited to this, and the second connection button may be locked so as not to be physically pressed. Moreover, while the camera 102 and the smartphone 101 are connected to each other in the second operation mode, unlike the first operation mode, the UI 406 of the camera 102 receives various kinds of user operations. For example, while the camera 102 and the smartphone 101 are connected to each other in the second operation mode, the user can transfer a predetermined image (including motion pictures and still pictures) from the camera 102 to the smartphone 101 by operating the camera 102.

Figure 11:
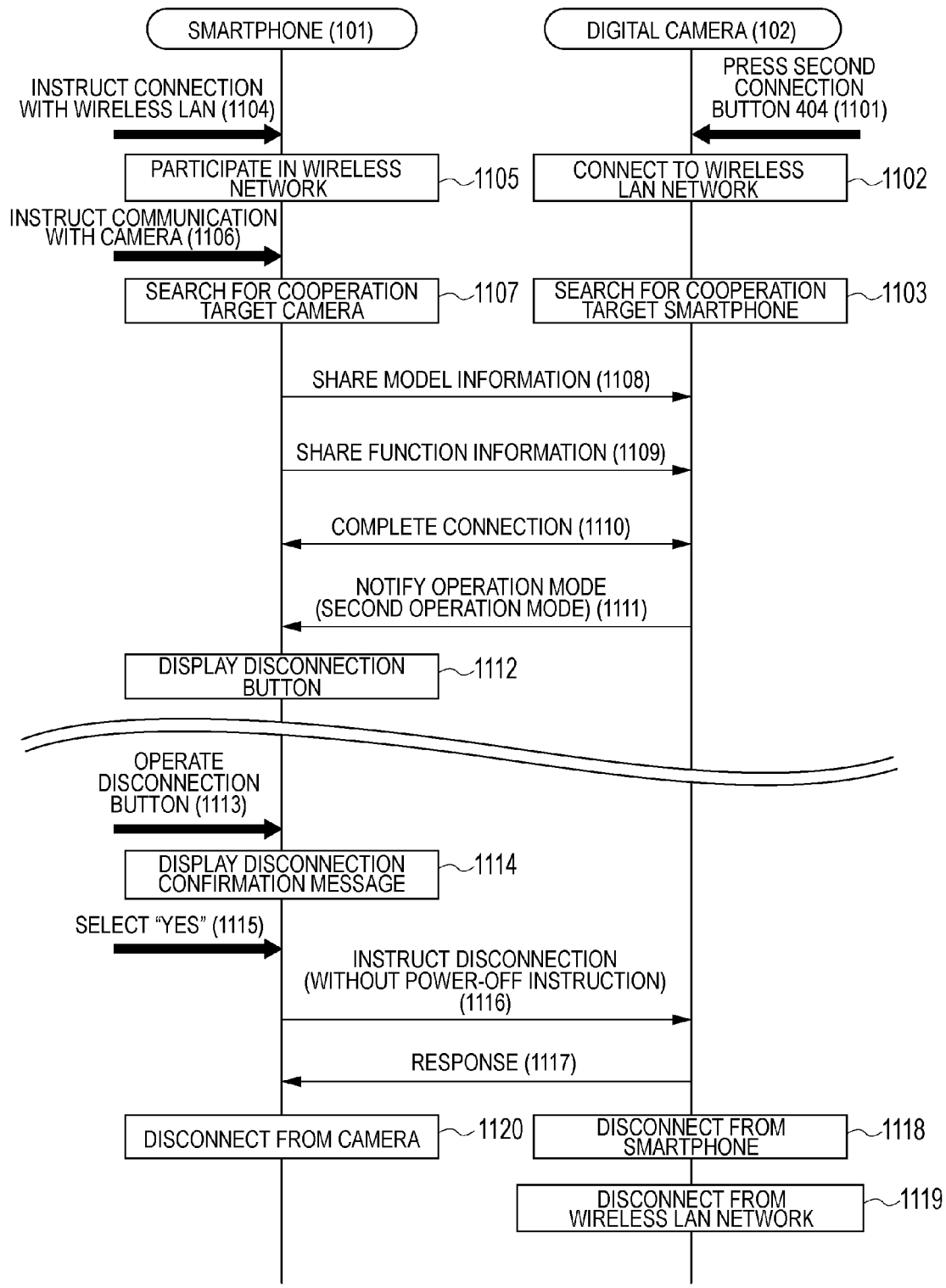
FIG. 11 is a sequence chart of the smartphone 101 and the camera 102.

FIG. 11 illustrates a sequence chart in a case where the camera 102 operates in the second operation mode. The smartphone 101 and the camera 102 operate according to the flowcharts of above-mentioned FIGS. 7 to 10. However, in the case of operating in the second operation mode, since the camera 102 is already in a power-on state, the camera 102 operates according to the flowchart from S802 illustrated in FIG. 8. Hereafter, an explanation is given with reference to FIGS. 7 to 10 in addition to FIG. 11 appropriately.

When the second connection button 404 is pressed by the user in the camera 102 (1101), the connection unit 502 connects to the AP 103 on the basis of the communication parameters stored in advance in the storage unit 402. Thus, the camera 102 participates in the wireless network established by the AP 103 (S802 and 1102). Subsequently, it advances to connection processing with the smartphone 101 (S803, see FIG. 9) and the search unit 503 search for the smartphone 101 (S901 and 1103).

Moreover, when wireless connection is instructed by the user in the smartphone 101 through the UI 203 (1104), the connection unit 301 connects to the AP 103 on the basis of the communication parameters stored in advance in the storage unit 202. Thus, the smartphone 101 participates in the wireless network established by the AP 103 (1105). Afterwards, when the connection with the camera 102 is instructed by the user through the UI 203 (1106), the search unit 302 starts searching for the camera 102 (S701 and 1107).

Subsequently, when the smartphone 101 and the camera 102 detect each other ("Yes" in S702 and "Yes" in S902), the smartphone 101 and the camera 102 share each other's model information (S703, S903 and 1108). After the model information is shared, the smartphone 101 and the camera 102 further shares each other's function information (S704, S904 and 1109).

Thus, the connection between the smartphone 101 and the camera 102 is established (1110). Here, when the connection is completed, the flowchart illustrated in FIG. 9 is terminated in the camera 102 and it advances to S804 of FIG. 8.

When the connection is completed, the function decision unit 309 of the smartphone 101 decides whether the camera 102 has a function to disconnect the power source of the camera 102 by itself according to an instruction from the smartphone 101 (S705). In a case where it is decided that the camera 102 has the function to disconnect the power source of the camera 102 by itself according to the instruction from the smartphone 101 ("Yes" in S705), the mode acquisition unit 304 acquire an operation mode from the camera 102 (S706 and 1111). Here, it is decided that the camera 102 has a function to disconnect the power source of the camera 102 by itself according to the instruction from the smartphone 101. Subsequently, the mode notification unit 505 of the camera 102 notifies the smartphone 101 that the camera 102 operates in the second operation mode (S804), and the mode acquisition unit 304 acquires information showing that the camera 102 operates in the second operation mode (S706). Further, the display control unit 305 causes the UI 203 to display a disconnection button to disconnect communication with the camera 102 (S707 and 1112). By operating this disconnection button, the user can disconnect the connection between the smartphone 101 and the camera 102, which was established in 611 of FIG. 6.

Afterwards, when the disconnection button is operated by the user (1113), the mode decision unit 306 decides whether the operation mode of the camera 102 is the first operation mode (S1001). Here, since it is not the first operation mode ("No" in S1001), the display control unit 305 inquires the user whether to disconnect from the camera 102, through the UI 203 (S1010 and 1114). To be more specific, a confirmation message such as "Is it OK to disconnect from the camera? [Yes], [No]" is displayed in the UI 203.

Thus, the user is inquired whether to turn off the power source of the camera 102 in a case where the camera 102 is in the first operation mode, while the user is inquired whether to disconnect from the camera 102 in a case where the camera 102 is in the second operation mode. That is, in a case where the camera 102 is in the second operation mode, unlike the case of the first operation mode, the smartphone 101 does not make an inquiry about the power source of the camera 102.

Here, in a case where "No" is selected, that is, in a case where the disconnection from the camera 102 is not permitted by the user ("No" in S1011), it returns to the state before the disconnection button is pressed, and the communication with the camera 102 is continued (S1004).

By contrast, in a case where "Yes" is selected, that is, in a case where the disconnection from the camera 102 is permitted by the user ("Yes" in S1011, and 1005), the instruction unit 307 instructs the camera 102 to disconnect the connection established in 611 of FIG. 6. To be more specific, the instruction unit 307 transmits a disconnection request message to the camera 102. Here, the disconnection request message does not include information that instructs the power-off (power disconnection) of the camera 102. Subsequently, the instruction unit 307 waits for a response from the camera 102 with respect to the disconnection request message (S1006).

The disconnection request message transmitted from the smartphone 101 is received by the disconnection instruction reception unit 506 of the camera 102 ("Yes" in S805 of FIG. 8). When the disconnection request message is received, the disconnection instruction reception unit 506 transmits a disconnection response message that is a response signal with respect to the disconnection request message (S806 and 1117). Next, the disconnection unit 507 disconnects the connection with the smartphone 101 (S807 and 1118). Subsequently, the disconnection unit 507 causes the camera 102 to drop out of the wireless network established by the AP 103 (S808 and 1119).

Next, the disconnection instruction reception unit 506 decides whether the received disconnection request message includes information to instruct the power-off of the camera 102 (S809). Here, since the information to instruct the power-off is not included ("No" in S809), the playback unit 508 transits to an image playback mode to display an image stored in the storage unit 402 on the UI 406 of the camera 102 (S811). At this time, the power source control unit 501 does not turn off the power source of the camera 102.

Meanwhile, the disconnection response message transmitted from the camera 102 is received by the instruction unit 307 of the smartphone 101 ("Yes" in S1007 of FIG. 10). Subsequently, the disconnection unit 308 performs disconnection processing of the connection with the camera 102 (622 and S1008).

Thus, in a case where the user presses the second connection button 404 in the camera 102 and thereby the camera 102 and the smartphone 101 are wirelessly connected to each other, even if the camera 102 and the smartphone 101 are disconnected from each other, the power source of the camera 102 is not disconnected. While the camera 102 and the smartphone 101 are connected to each other in the second operation mode, unlike the first operation mode, the UI 406 of the camera 102 receives various kinds of user operations. Therefore, there is a possibility that the user operates the camera 102 during the connection and keeps operating the camera 102 even after the disconnection. In such a case, since the power source of the camera 102 is not disconnected even if the camera 102 and the smartphone 101 are disconnected from each other, it is possible to improve the user's convenience of the camera 102.

In the above, an explanation has been given to the sequence between the smartphone 101 and the camera 102 that has the function to disconnect the power source of the camera according to an instruction from the smartphone 101. Next, an explanation is given to a sequence between the smartphone 101 and the camera 105 that does not have the function to disconnect the power source of the camera according to an instruction from the smartphone 101.

Figure 12:
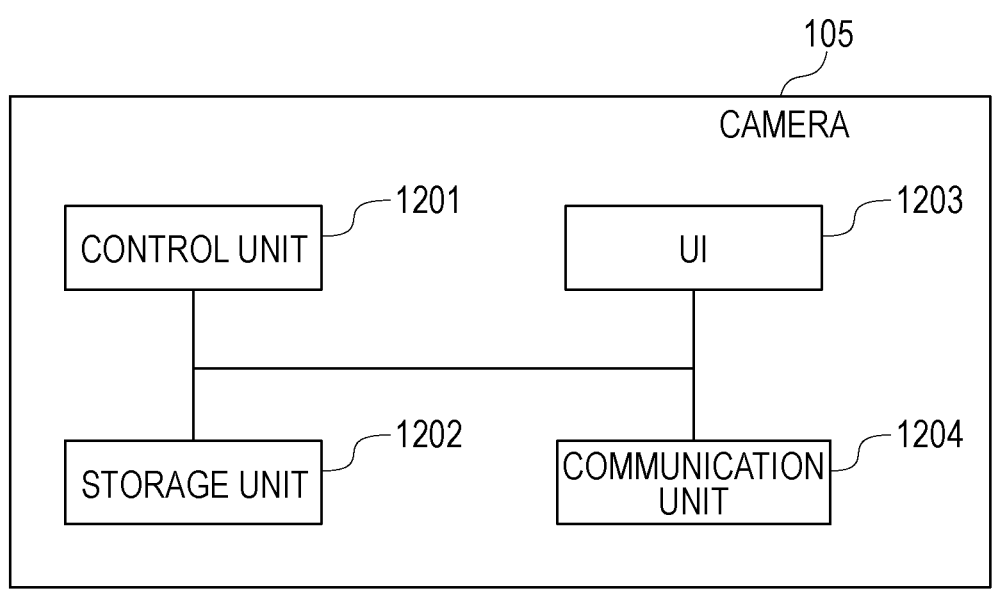
FIG. 12 is a hardware configuration diagram of a camera 105.

FIG. 12 illustrates a hardware configuration of the camera 105. A control unit 1201, a storage unit 1202, a UI 1203 and a communication unit 1204 have similar operation to the control unit 401, the storage unit 402, the UI 406 and the communication unit 407, respectively, and therefore their explanation is omitted herein.

Figure 13:
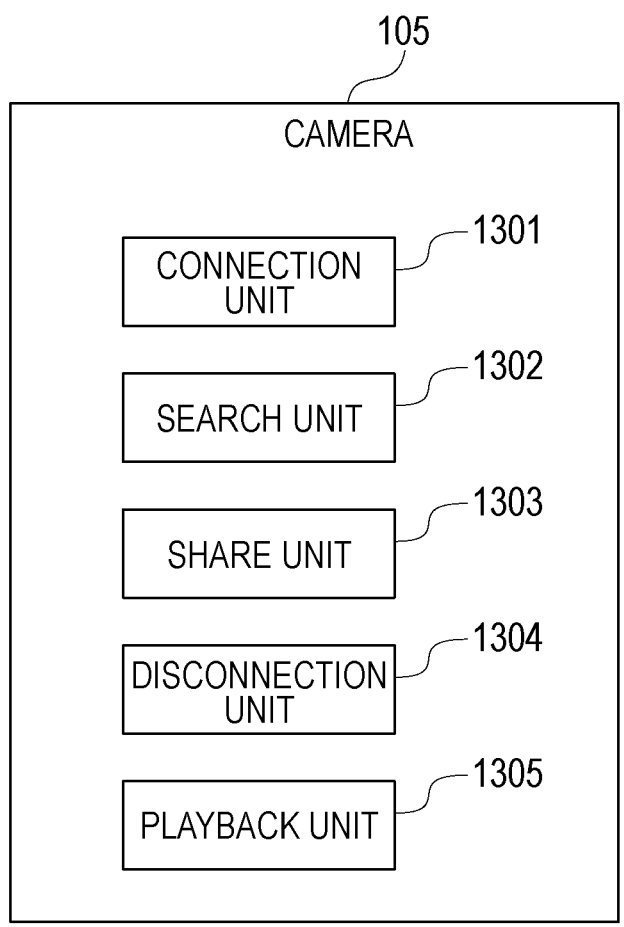
FIG. 13 is a software function block diagram of the camera 105.

FIG. 13 illustrates a software block diagram of the camera 105. A connection unit 1301, a search unit 1302, a share unit 1303, a disconnection unit 1304 and a playback unit 1305 perform similar operation to the connection unit 502, the search unit 503, the share unit 504, the disconnection unit 507 and the playback unit 508, respectively.

Figure 14:
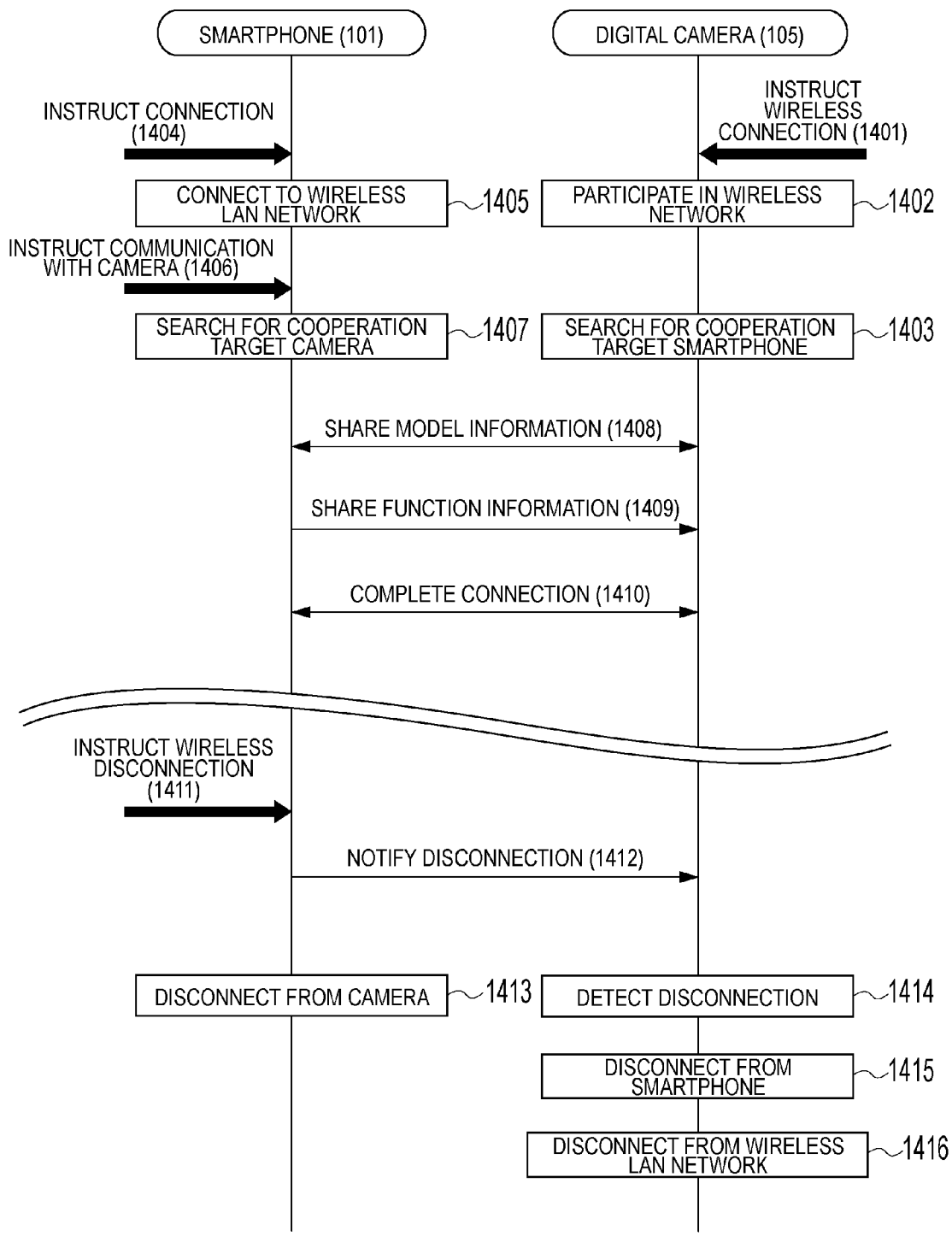
FIG. 14 is a sequence chart of the smartphone 101 and the camera 105.

FIG. 14 illustrates a sequence chart between the smartphone 101 and the camera 105 that does not have a function to disconnect the power source of the camera according to an instruction from the smartphone 101. The smartphone 101 performs operation according to flowcharts of FIGS. 7 and 10 described above. The camera 105 performs operation according to the flowchart of FIG. 15 instead of FIG. 8 described above. In the following, an explanation is given with reference to FIGS. 7, 9, 10 and 15 in addition to FIG. 14 appropriately.

Figure 15:
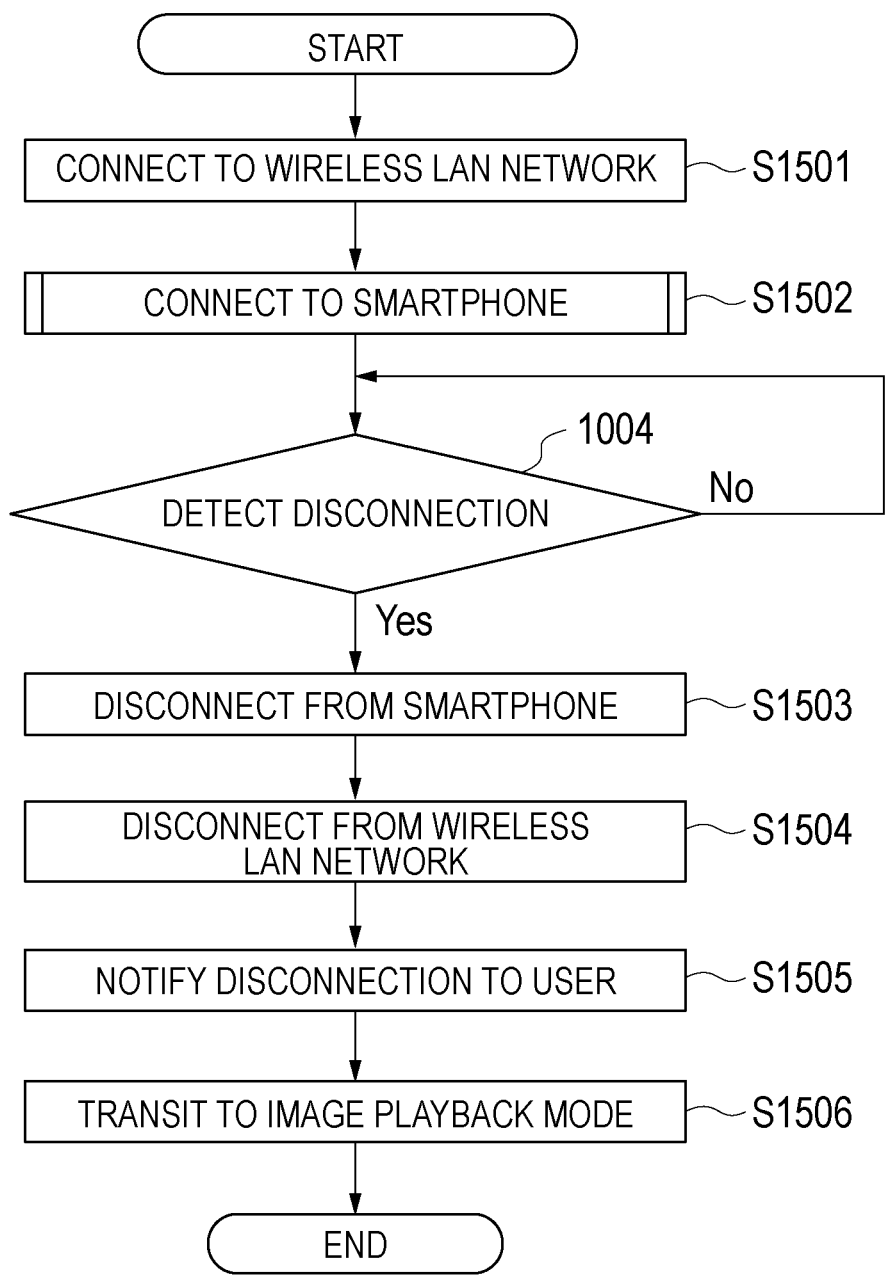
FIG. 15 is a flowchart realized by the camera 105.

FIG. 15 is a flowchart realized by reading out a program stored in the storage unit 402 by the control unit 401 in a case where wireless connection is instructed by the user in the camera 105 (1401).

When the wireless connection is instructed by the user through the UI 1203 of the camera 105 (1401), the connection unit 1301 connects to the AP 103 on the basis of communication parameters stored in advance in the storage unit 1202. Thus, the camera 105 participates in the wireless network established by the AP 103 (1402 and S1501). Subsequently, it advances to connection processing with the smartphone 101 (S1502). FIG. 9 illustrates details of the processing in S1502. First, the search unit 1302 searches for the smartphone 101 as the connection processing of the camera 105 (S901 and 1403).

Moreover, when the wireless connection is instructed by the user in the smartphone 101 through the UI 203 (1404), the connection unit 301 connects to the AP 103 on the basis of the communication parameters stored in advance in the storage unit 202. Thus, the smartphone 101 participates in the wireless network established by the AP 103 (1405). Afterwards, when the connection with the camera 105 is instructed by the user through the UI 203 (1406), the search unit 302 starts searching for the camera 105 (S701 and 1407).

Subsequently, when the smartphone 101 and the camera 105 detect each other ("Yes" in S702 and "Yes" in S902), the smartphone 101 and the camera 105 share each other's model information (S703, S903 and 1408). When the model information is shared, the smartphone 101 and the camera 105 further share each other's function information (S704, S904 and 1409).

Thus, the connection between the smartphone 101 and the camera 105 is established (1410). Here, when the connection is completed, the flowchart illustrated in FIG. 9 is terminated in the camera 105, and it advances to S1503 of FIG. 15.

When the connection is completed, the function decision unit 309 of the smartphone 101 decides whether the camera 105 has a function to disconnect the power source of the camera 102 by itself according to the instruction from the smartphone 101 (S705). Here, it is not decided that it has the function ("No" in S705), the mode acquisition unit 304 does not acquire the operation mode of the camera and the display control unit 305 does not display the disconnection button.

Afterwards, when the communication is forcefully terminated in the smartphone 101, the instruction unit 307 instructs the camera 105 to disconnect the connection established in 1410 of FIG. 14. To be more specific, the instruction unit 307 transmits a disconnection message (here, a byebye message defined by UPnP or mDNS) to the camera 105 (1412). Here, the disconnection request message does not include information that instructs the power-off (power disconnection) of the camera 105. Subsequently, the disconnection unit 308 performs disconnection processing of the connection with the camera 105 (1413).

Also, the forced termination of communication is caused in a case where a termination instruction of an application used for communication with the camera 105 in the smartphone 101, a stop instruction of a wireless unit of the smartphone 101 or a power-off operation of the smartphone 101 is given.

Meanwhile, when the disconnection unit 1304 of the camera 105 receives the disconnection message from the smartphone 101 (1414), it disconnects the connection with the smartphone 101 (S1503 and 1415). Subsequently, the disconnection unit 1304 causes the camera 105 to drop out of the wireless network established by the AP 103 (S1504 and 1416). Further, the disconnection unit 1304 notifies the user that the communication with the smartphone 101 is disconnected through the UI 1203 (S1505). Further, the camera 105 is not powered off and the playback unit 1305 transits to an image playback mode to display an image stored in the storage unit 1202 on the UI 1203 of the camera 105 (S1506).

As described above, the smartphone 101 does not instruct power-off to the camera 105 that does not have a function to disconnect the power source of the camera according to an instruction from the smartphone 101. By this means, it is possible to avoid troubles that can be caused by an instruction related to a function that is not supported by the camera 105.

The present invention provides one or some of the plurality of above-mentioned effects.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-283087, filed Dec. 26, 2012, which is hereby incorporated by reference herein in its entirety.

What is claimed is:

1. A communication apparatus that performs wireless communication with a different communication apparatus, comprising:
   a processor and memory;
   a first notification unit configured to notify the different communication apparatus of first information that enables the different communication apparatus to decide whether the communication apparatus has a function to disconnect a power source according to an instruction from the different communication apparatus;
   a second notification unit configured to notify the different communication apparatus of second information that shows an operation mode of the communication apparatus;
   a reception unit configured to receive a disconnection instruction of communication between the communication apparatus and the different communication apparatus, and a power disconnection instruction of the communication apparatus, from the different communication apparatus; and
   a control unit configured to disconnect the communication with the different communication apparatus and disconnect the power source of the communication apparatus in a case where the reception unit receives the disconnection instruction and the power disconnection instruction,
   wherein the units are implemented upon execution of instructions stored in the memory by the processor.

2. A control method of a communication apparatus that performs wireless communication with a different communication apparatus, the communication apparatus including a processor that executes a program stored in memory to execute the following steps:
   a first notification step of notifying the different communication apparatus of first information that enables the different communication apparatus to decide whether the communication apparatus has a function to disconnect a power source according to an instruction from the different communication apparatus;
   a second notification step of notifying the different communication apparatus of second information that shows an operation mode of the communication apparatus;
   a reception step of receiving a disconnection instruction of communication between the communication apparatus and the different communication apparatus, and a power disconnection instruction of the communication apparatus, from the different communication apparatus; and
   a control step of disconnecting the communication with the different communication apparatus and disconnect the power source of the communication apparatus in a case where the disconnection instruction and the power disconnection instruction are received in the reception step.

3. A non-transitory storage medium storing a program that causes a computer to operate as a communication apparatus comprising:
   a first notification step of notifying the different communication apparatus of first information that enables the different communication apparatus to decide whether the communication apparatus has a function to disconnect a power source according to an instruction from the different communication apparatus;

a second notification step of notifying the different communication apparatus of second information that shows an operation mode of the communication apparatus;

a reception step of receiving a disconnection instruction of communication between the communication apparatus and the different communication apparatus, and a power disconnection instruction of the communication apparatus, from the different communication apparatus; and a control step of disconnecting the communication with the different communication apparatus and disconnect the power source of the communication apparatus in a case where the disconnection instruction and the power disconnection instruction are received in the reception step.

4. The communication apparatus according to claim 1, further comprising a connection unit configured to wirelessly connect to the different communication apparatus according to a user's instruction.

5. The communication apparatus according to claim 4, wherein the disconnection instruction is an instruction for disconnect the different communication apparatus to which the connection unit wireless connects.

6. The communication apparatus according to claim 1, wherein the different communication apparatus is notified of the first information or the second information by wireless communication in accordance with the IEEE802.11 series or Bluetooth.

7. The communication apparatus according to claim 1, wherein a response to the disconnection instruction is transmitted to the different communication apparatus in a case where the reception unit receives the disconnection instruction.

8. The communication apparatus according to claim 1, wherein a user is notified of disconnecting the different communication apparatus in a case where the reception unit receives the disconnection instruction.

9. The communication apparatus according to claim 1, further comprising a first button and a second button, wherein the operation mode is determined according to which of the first button or the second button is pressed.

10. The communication apparatus according to claim 9,
wherein the second button is a button that is not operated in a case where power of the communication apparatus is disconnected, and
wherein the first button is a button that is operated even in a case where power of the communication apparatus is disconnected.

* * * * *